US008074913B2

(12) United States Patent
Irwin (10) Patent No.: US 8,074,913 B2
(45) Date of Patent: Dec. 13, 2011

(54) COMBINATION THERMOFORMING TRIM PRESS AND COMMINUTING APPARATUS

(76) Inventor: Jere F. Irwin, Yakima, WA (US)

( * ) Notice: Subject to any disclaimer, the term of this patent is extended or adjusted under 35 U.S.C. 154(b) by 0 days.

(21) Appl. No.: 12/196,468

(22) Filed: Aug. 22, 2008

(65) Prior Publication Data

US 2009/0051073 A1     Feb. 26, 2009

Related U.S. Application Data

(63) Continuation of application No. 11/211,914, filed on Aug. 24, 2005, now Pat. No. 7,419,110.

(60) Provisional application No. 60/695,964, filed on Jul. 1, 2005.

(51) Int. Cl.
*B02C 25/00* (2006.01)
(52) U.S. Cl. .................. 241/101.2; 241/224; 241/236
(58) Field of Classification Search .................. 241/236, 241/224, 101.2
See application file for complete search history.

(56) References Cited

U.S. PATENT DOCUMENTS

| 3,350,744 | A | * | 11/1967 | Sederlund et al. ............ 425/298 |
| 3,386,670 | A | | 6/1968 | Heger |
| 4,013,234 | A | | 3/1977 | Fay |
| 4,313,358 | A | * | 2/1982 | Brown ............................ 83/97 |
| 4,687,144 | A | | 8/1987 | Irwin et al. |
| 4,890,524 | A | * | 1/1990 | Brown et al. ................... 83/615 |
| 5,076,504 | A | | 12/1991 | Young |
| 5,199,340 | A | * | 4/1993 | Lamson ........................... 83/82 |
| 5,860,607 | A | | 1/1999 | Irwin |
| 6,644,573 | B2 | | 11/2003 | Irwin |
| 7,077,348 | B2 | | 7/2006 | Johnson et al. |
| 2005/0067516 | A1 | * | 3/2005 | Irwin et al. .................... 241/236 |

* cited by examiner

*Primary Examiner* — Faye Francis
(74) *Attorney, Agent, or Firm* — Wells St. John P.S.

(57) ABSTRACT

A combination thermoforming trim press and comminuting apparatus is provided. The combination includes a horizontal trim press, a comminuting apparatus, and a height-adjustable delivery chute. The trim press has an exit for downwardly delivering a scrap web of thermoformable sheet material. The comminuting apparatus is provided beneath the exit and has an entrance for receiving the scrap web. The height-adjustable delivery chute is provided between the trim press exit and the comminuting apparatus entrance and includes a first section, a second section telescopically received relative to the first section to provide height adjustment, and a fastener for securing the chute at a selected height to substantially close any gaps between the trim press exit, the comminuting apparatus entrance and the delivery chute to eliminate any need for a shielding cage to prevent internal finger and limb access by an operator.

15 Claims, 8 Drawing Sheets

COMBINATION THERMOFORMING TRIM PRESS AND COMMINUTING APPARATUS

RELATED PATENT DATA

This patent application is a continuation application and claims the benefit of U.S. patent application Ser. No. 11/211,914, filed Aug. 24, 2005, entitled "Comminuting Apparatus and Material Receiving Duct for Comminuting Apparatus", naming Jere F. Irwin as inventor, now U.S. Pat. No. 7,419,110 issued Sep. 2, 2008, which claims the benefit of U.S. Provisional Patent Application Ser. No. 60/695,964, which was filed Jul. 1, 2005, entitled "Comminuting Apparatus and Material Receiving Duct for Comminuting Apparatus", both of which are incorporated by reference herein.

TECHNICAL FIELD

This invention pertains to apparatus for subdividing waste material from a trim press. More particularly, the present invention relates to plenums, receiving ducts, docking stations, and entrance plenums for comminuting apparatus, as well as comminuting apparatus.

BACKGROUND OF THE INVENTION

A variety of comminuting apparatus are known for use with horizontal trim presses for subdividing scrap material that is generated by a trim press on a thermoforming line. More particularly, horizontal trim presses are configured to generate a scrap thermoformed web from which articles have been severed via the trim press. The web is delivered in a downward direction from the trim press and into a comminuting apparatus. Several such apparatus are sold as Chesaw® comminuting apparatus, Model Nos. Standard Series, C-Series, M-Series, and CLS, sold by Irwin Research & Development, of Yakima, Wash. Such a comminuting apparatus has an entrance duct formed by a pair of guide plates that guide scrap web into the comminuting apparatus from a trim press. However, there are gaps between the exit of the trim press and the entrance duct of the comminuting apparatus sufficient for an operator to insert a limb. Therefore, it is necessary to provide a protective cage about the area between the entrance duct of the comminuting apparatus and the exit of the trim press when incorporated into a thermoforming line. It is possible to construct a trim press with a custom-sized entrance duct that perfectly matches the exit clearance beneath a particular trim press. However, comminuting apparatus are frequently removed from beneath a particular trim press in order to clean out material from the comminuting apparatus when changing the materials that are being formed by a particular thermoforming line. Oftentimes, the comminuting apparatus may be subsequently placed beneath another trim press on another thermoforming line. It is usually the case that different trim presses on different thermoforming lines have different vertical clearances, which means that comminuting apparatus with a custom-sized vertical entrance duct clearance height will not interchangeably fit between different trim presses without leaving a potentially hazardous gap between the trim press exit and the comminuting apparatus entrance duct. Accordingly, a need exists to efficiently and easily adjust the vertical clearance height for an entrance duct of a comminuting apparatus when mating the comminuting apparatus beneath each one of several trim presses.

SUMMARY OF THE INVENTION

A docking station and adjustable material receiving duct, or plenum are provided for mating, respectively, with an exit end of a trim press and an entrance manifold of a comminuting apparatus.

According to one aspect, a material receiving duct is provided for a comminuting apparatus. The material receiving duct includes a material entrance section, a material exit section, and a telescoping section. The material entrance section has a material entrance. The material exit section is provided beneath the material entrance section with a material exit configured to mate with an entrance enclosure of a comminuting apparatus. The telescoping section is provided between the entrance section and the exit section to adjust height of the material entrance.

According to another aspect, a material entrance plenum is provided for a comminuting apparatus. The entrance plenum has a material entrance duct with a height-adjustable entrance and a length-adjustable delivery chute, as well as a base configured to mate the plenum with a frame of the comminuting apparatus.

According to yet another aspect, a comminuting apparatus is provided having an enclosure, at least two scissor rolls, a material entrance, and a height-adjustable delivery chute. The enclosure has an entrance manifold. The at least two scissor rolls are carried within the enclosure, each with scissor rings configured to intermesh to cut waste material received therebetween. The height-adjustable delivery chute is provided between the material entrance and the entrance manifold and is operative to adjust operating height of the material entrance.

BRIEF DESCRIPTION OF THE DRAWINGS

Preferred embodiments of the invention are described below with reference to the following accompanying drawings.

FIG. 7 is a bottom view taken from beneath FIG. 4.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention comprising a docking station for a thermoforming trim press and a material receiving duct, or plenum, for a comminuting apparatus. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
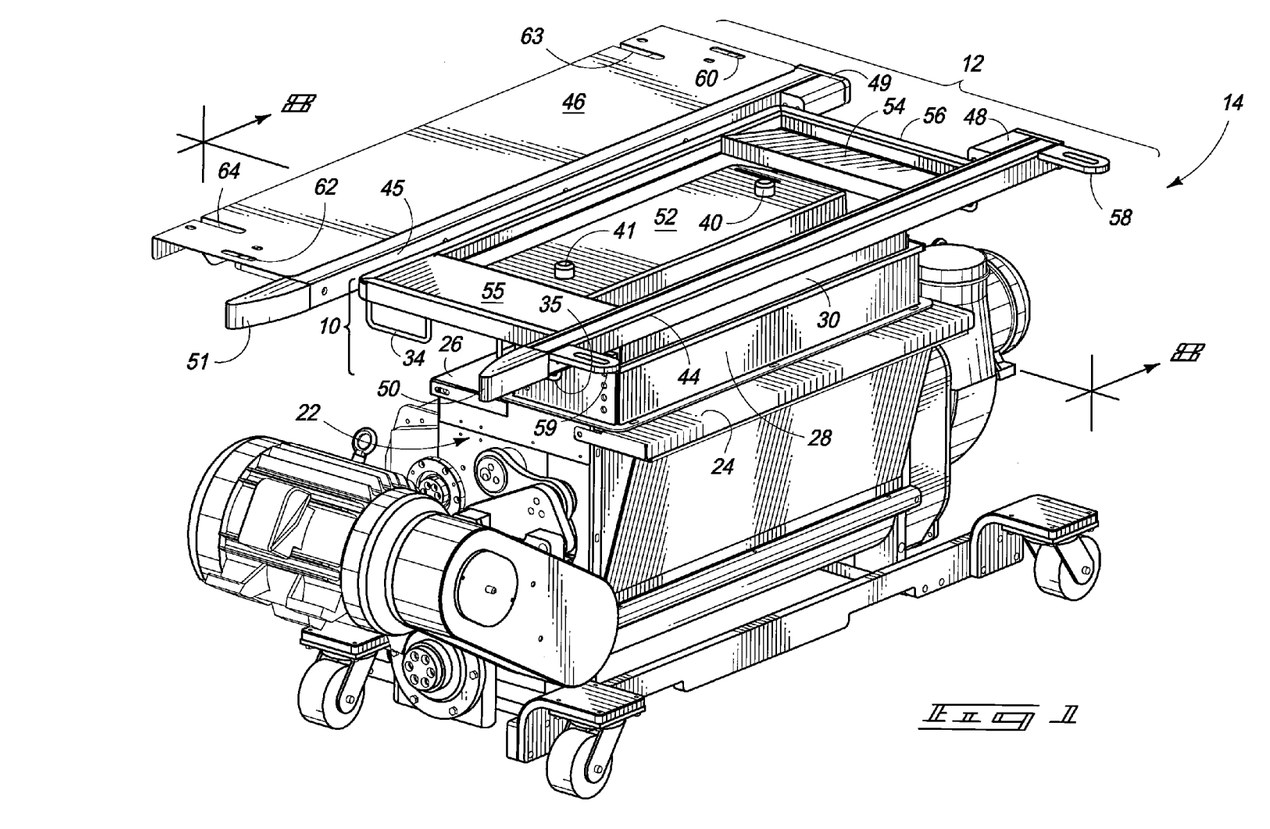
FIG. 1 is a simplified perspective view of a comminuting apparatus having a material receiving duct and including a docking station that cooperates between a trim press and the comminuting apparatus according to one aspect of the present invention.
Figure 2:
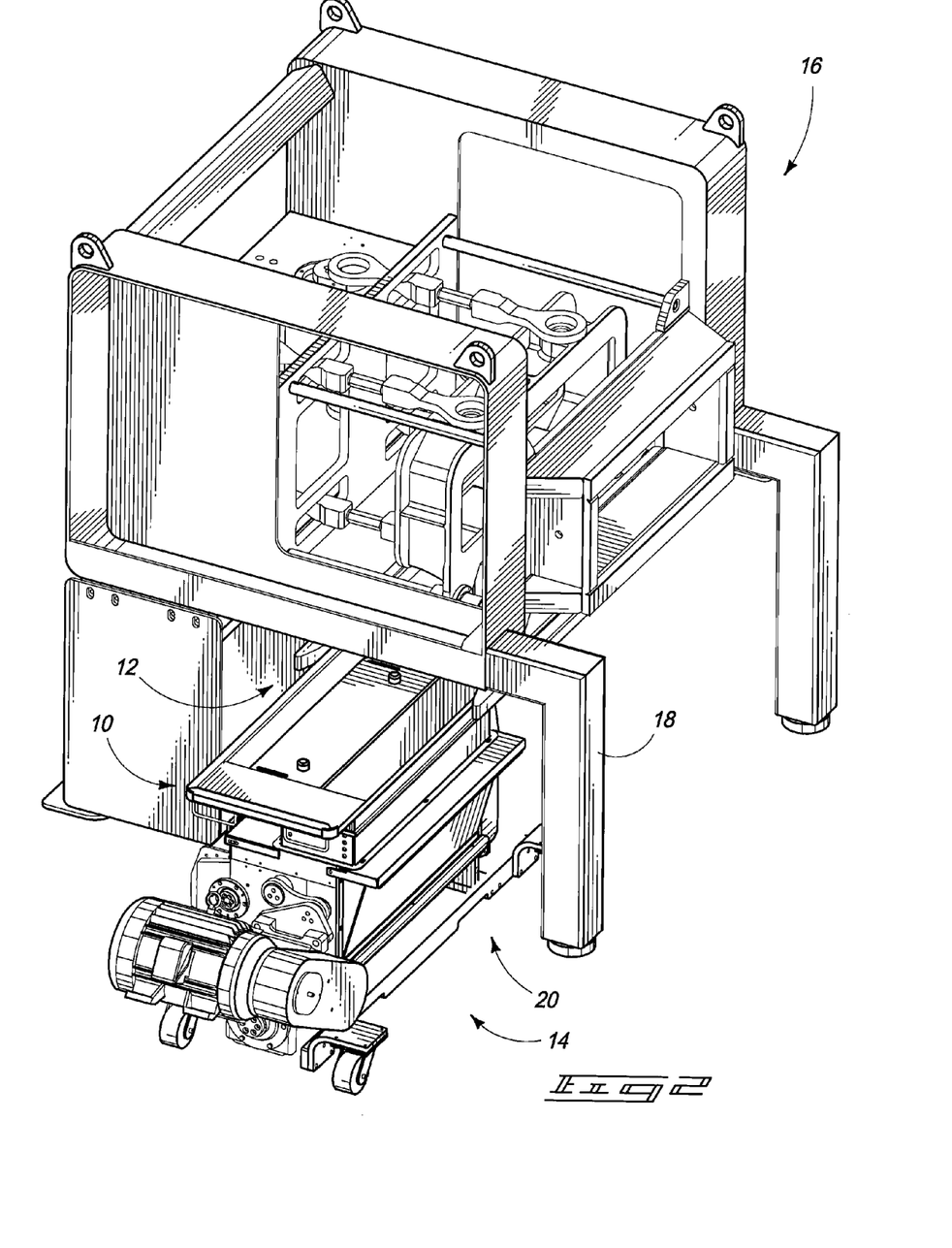
FIG. 2 is a simplified perspective view of a trim press, comminuting apparatus, and material receiving duct according to one aspect of the present invention, illustrating the comminuting apparatus being moved under the trim press to mate the material receiving duct with the docking station.
Figure 3:
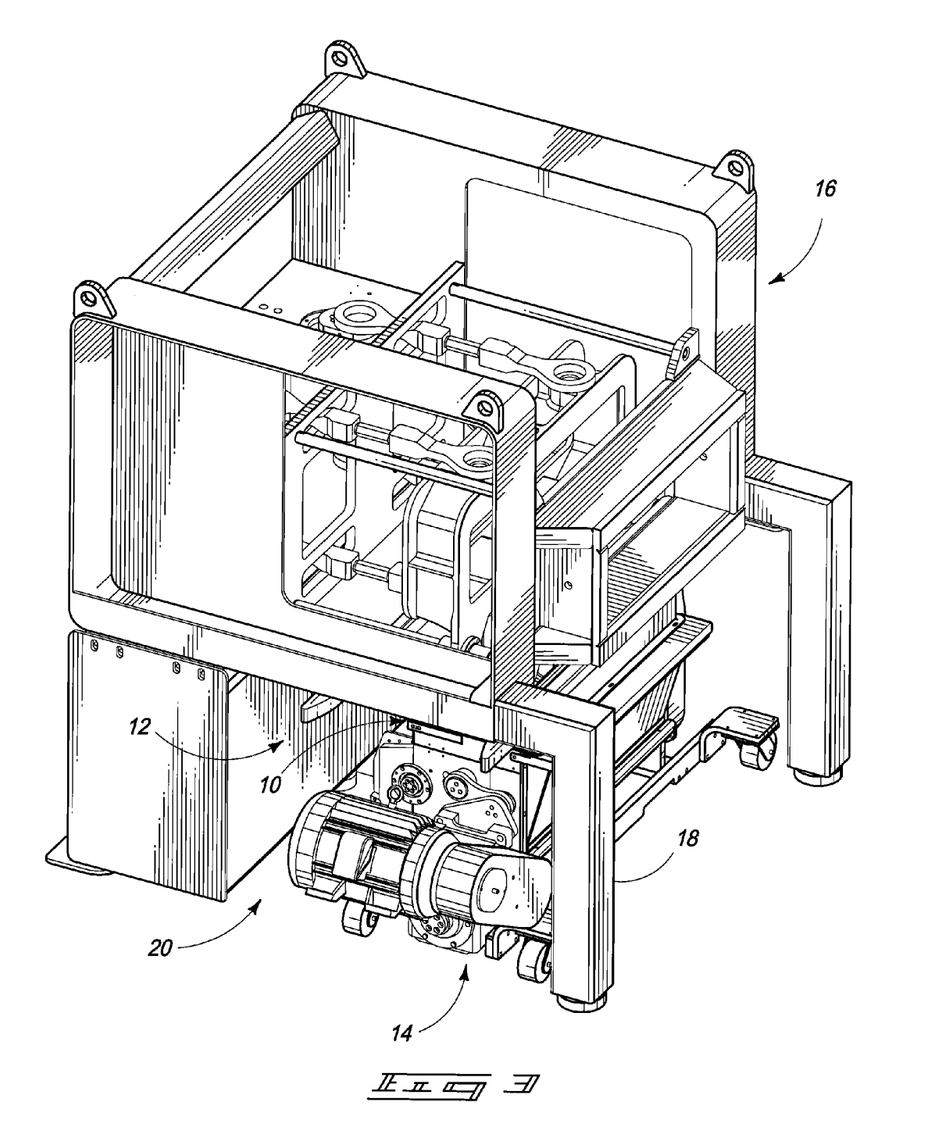
FIG. 3 is a simplified perspective view corresponding with that depicted in FIG. 2, but illustrating the comminuting apparatus after completion of docking of the material receiving duct of the comminuting apparatus with the docking station affixed to the trim press.

FIG. 1 illustrates a material receiving duct 10 provided on a comminuting apparatus 14 for mating and demating with a docking station 12 of a horizontal trim press 16 (see FIGS. 2-7). Docking station 12 is secured to a frame 18 of a horizontal trim press 16 above a top edge of a bay, or stall, 20 in which comminuting apparatus 14 can be inserted and removed, as shown in FIGS. 2 and 3. Material receiving duct 10 provides an entrance plenum that can be adjusted in elevational height by adjusting the vertical length of the delivery chute provided by the material receiving duct 10 such that no gap is provided between a topmost portion of material receiving duct 10 and an exit portion of a trim press provided above docking station 12. Accordingly, an exit end of trim press 16 mates relatively close in engagement with an entrance end of receiving duct 10 for a comminuting apparatus 14 such that an operator's hands or limbs cannot be inserted into the receiving duct of the comminuting apparatus, thereby eliminating any need for extra shielding or cage components between trim press 16 and comminuting apparatus 14.

In operation, material receiving duct 10 enables quick and easy change-out of comminuting apparatus 14 from beneath different trim presses 16 in different thermoforming lines. It is commonly the case that the height provided beneath an exit end of a trim press will vary between thermoforming lines and setups. It is also the case that a comminuting apparatus might be removed in order to maintain, clean, and/or repair the comminuting apparatus. Such removal can otherwise shut down a thermoforming line. Hence, it is desirable to interchange different comminuting apparatus for insertion beneath different trim presses. However, the variations in clearance height otherwise require that an operator provide caging around and between the trim press and the comminuting apparatus in order to prevent operators and users from inadvertently inserting fingers or limbs into an entrance end of the comminuting apparatus, which might cause serious harm or injury.

Material receiving duct 10 enables the interchange of different comminuting apparatus so they closely mate with different trim presses in a ready and easy manner by enabling quick and easy height adjustment by vertically changing the length of material receiving duct 10.

Figure 6:
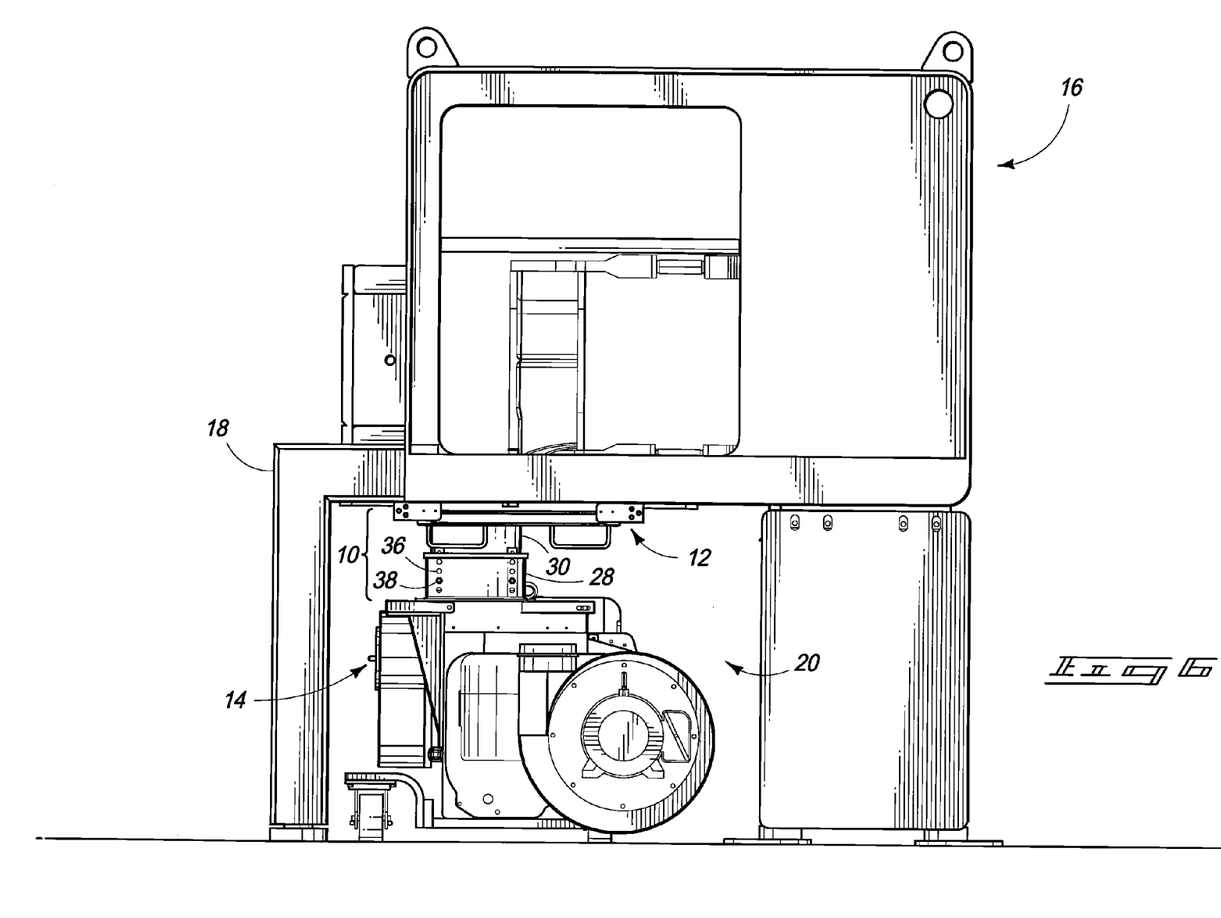
FIG. 6 is a right end view of the trim press, comminuting apparatus, material receiving duct, and docking station of FIG. 4.

As shown in FIG. 1, comminuting apparatus 14 includes an enclosure 22. A pair of top covers 24 and 26 are affixed onto a top end of enclosure 22, atop which a lower entrance chute member, or material exit section, 28 is rigidly affixed via a plurality of fasteners. An upper entrance chute member, or a material entrance section 30, is telescopically received within member 28. Accordingly, a telescoping section 31 is provided between member 28 and chute member 30. By adjusting the relative telescopic positions between members 28 and 30, and locking together such positions via a plurality of fasteners placed into selected, aligned pairs of apertures, a desired vertical height can be provided for material receiving duct 10 when inserting comminuting apparatus 14 within a certain environment beneath a specific trim press. A pair of fasteners 38 is used to lock together each end of members 28 and 30, as shown in FIG. 6. Fasteners 38 have been omitted from FIGS. 1-2 and 8 in order to show the apertures in each of members 28 and 30.

Figure 4:
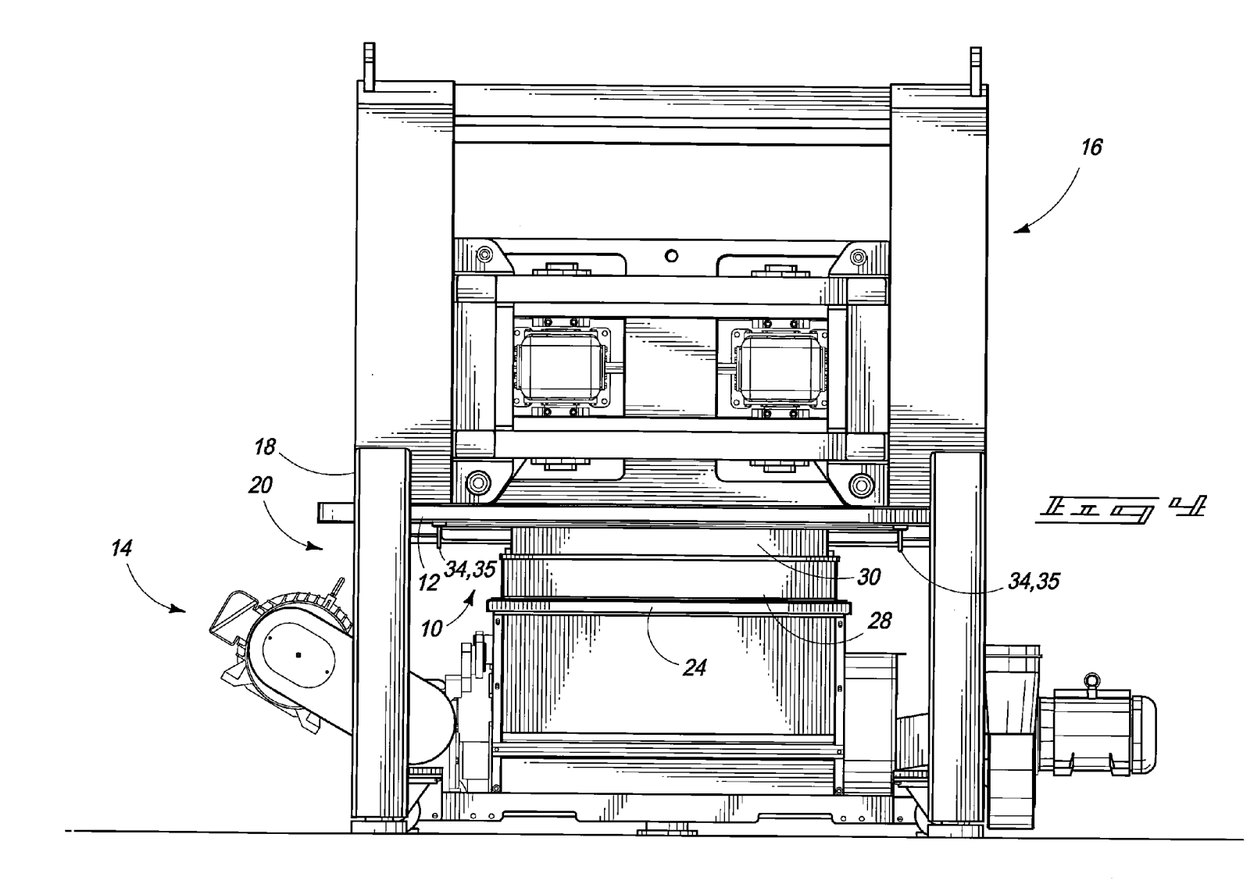
FIG. 4 is a simplified, vertical exit end view of the trim press, comminuting apparatus, material receiving duct and docking station of FIG. 3.
Figure 8:
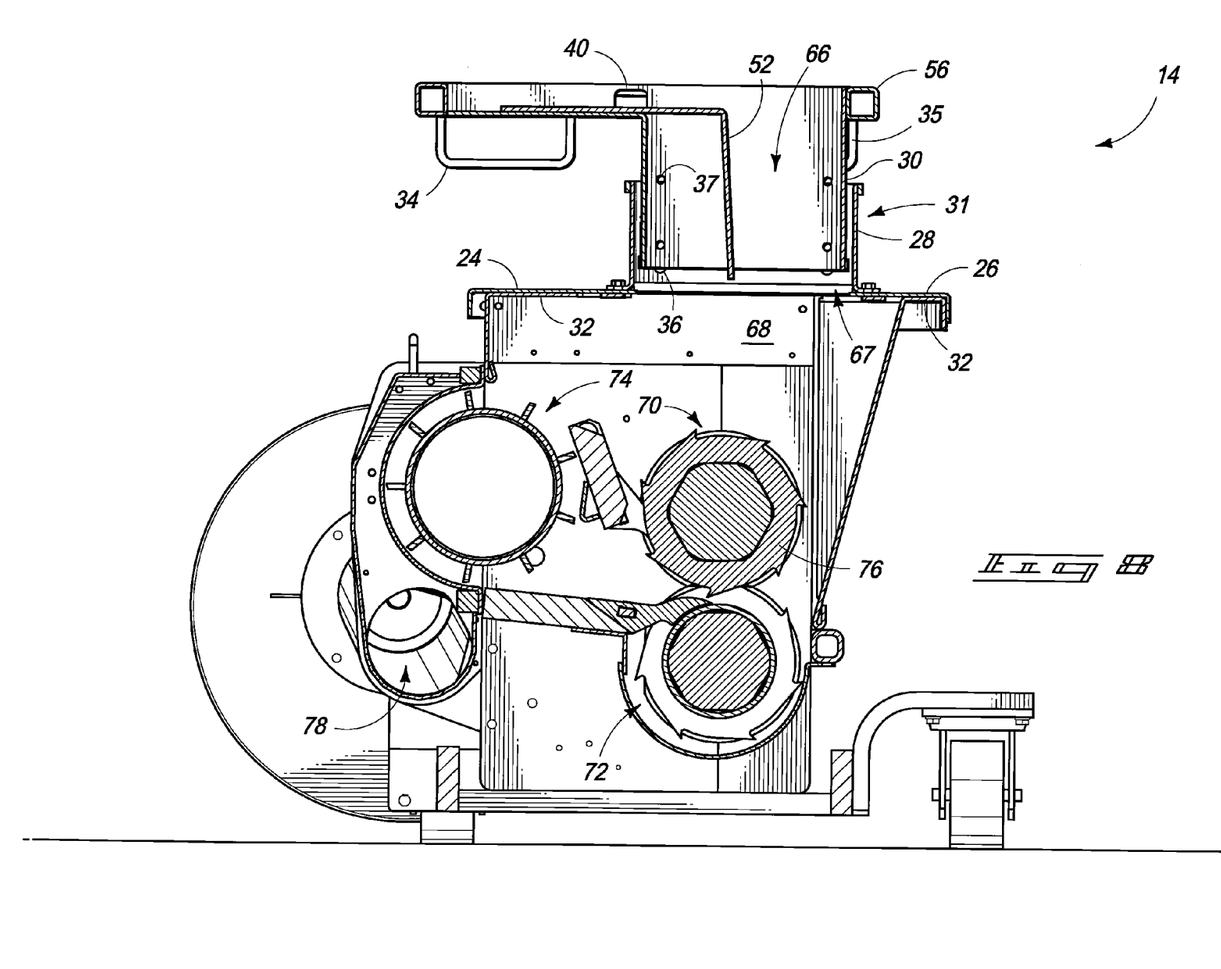
FIG. 8 is a vertical sectional view taken along line 8-8 of the comminuting apparatus and material receiving duct of FIGS. 1-7.
Figure 11:
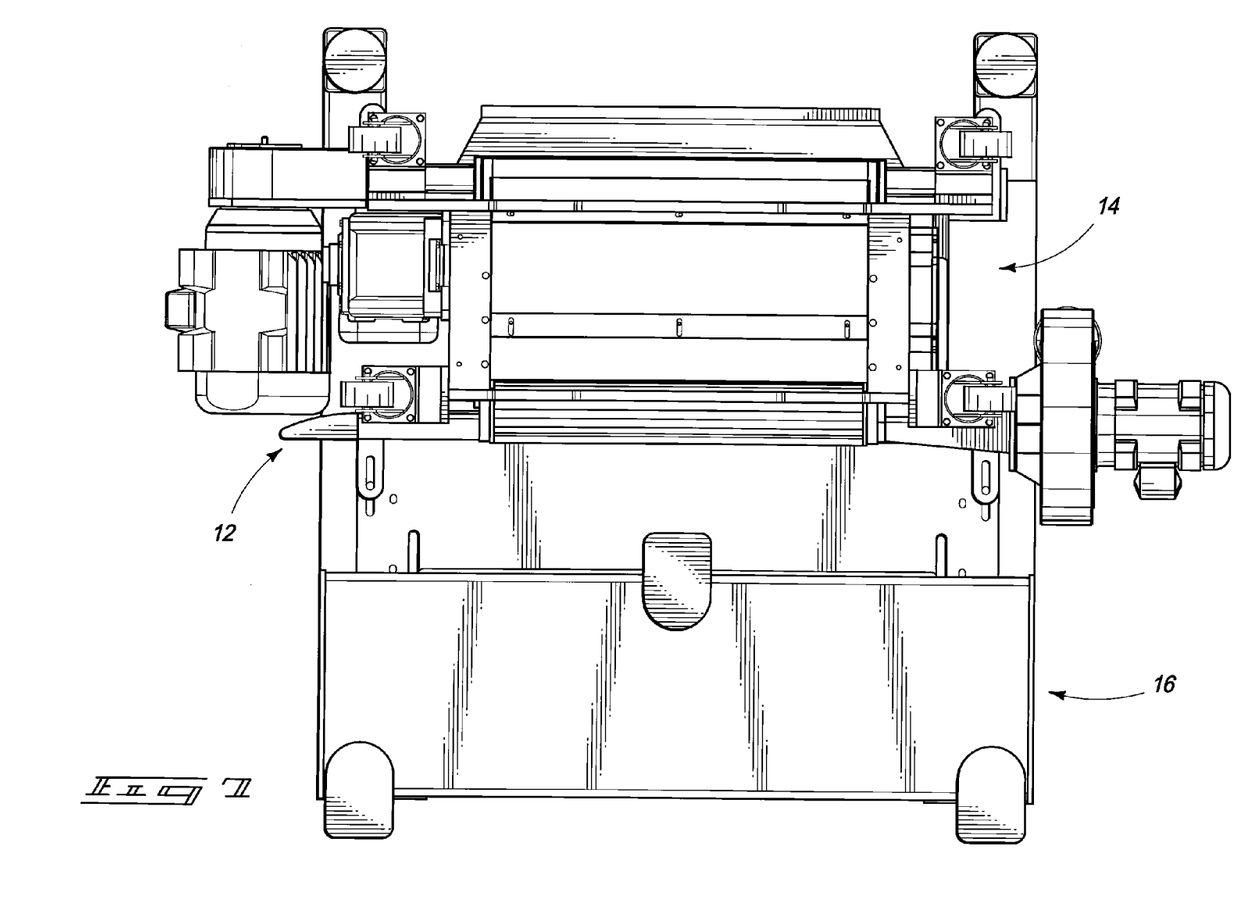

Covers 24 and 26 are affixed atop a top wall 32 (see FIG. 8) of enclosure 22. A pair of handles 34 and 35, shown in FIGS. 1, 4 and 8, is provided at each end of member 30 to facilitate height-adjustable positioning of member 30 relative to member 20 prior to docking comminuting apparatus 14 with docking station 12 on a particular trim press. Additionally, handles 34 and 35 facilitate the insertion and removal of comminuting apparatus 14 from bay 20 beneath trim press 16, as shown in FIGS. 2 and 3. Typically, a trim press 14 is provided with a plurality of wheels which facilitate positioning of comminuting apparatus 14 beneath a trim press 16.

Figure 5:
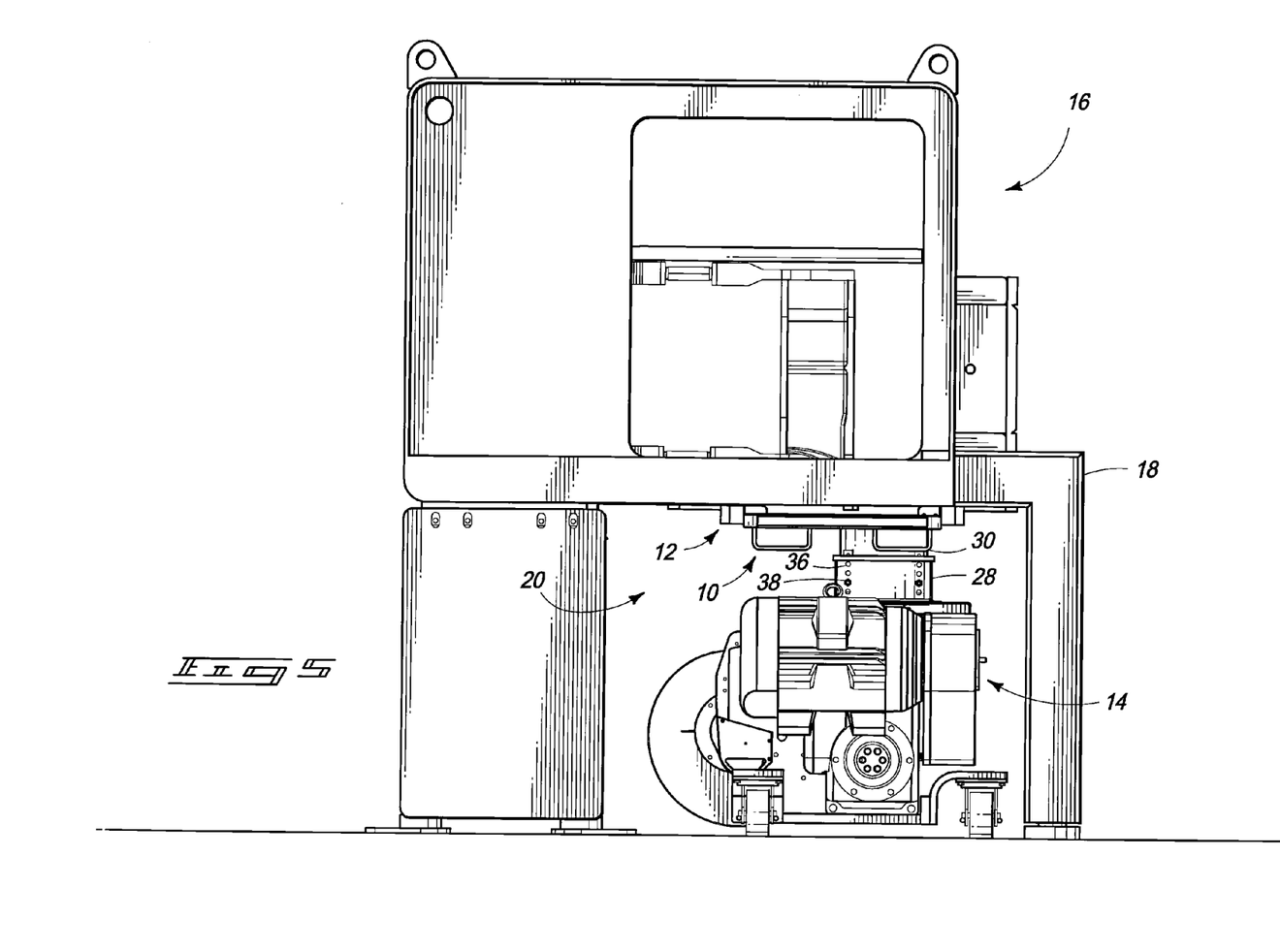
FIG. 5 is a simplified left end elevational view of a trim press and a comminuting apparatus having the material receiving duct and docking station of FIG. 4.

As shown in FIGS. 4-6, material receiving duct 10 is telescopically adjusted to a desired position where it is subsequently affixed via a plurality of fasteners, such as ½" by ½" SHSB bolts and mating nuts, after which the comminuting apparatus is snugly inserted to be received within docking station 12 beneath a trim press 16. As shown in FIG. 6, a pair of fasteners 38, such as a bolt and nut, is inserted into one of a plurality of apertures 36 in member 28 as well as one of a plurality of apertures 37 in member 30 to affix the adjusted height of receiving duct 10 to a desired level. Optionally, a quick-release fastener, such as a ball-lock fastener, can also be utilized to affix the height-adjusted positioning of receiving duct 10; namely, the elevational positioning of member 30 relative to member 28.

FIG. 7 illustrates the positioning of comminuting apparatus 14 relative to trim press 16 when comminuting apparatus 14 is fully received within docking station 12.

As shown in FIG. 1, docking station 12 comprises a pair of guide rails 44, 45 and a mounting plate 46 that are affixed onto a frame (such as frame 18 of FIG. 2) of a trim press via a plurality of threaded fasteners (not shown). More particularly, a plurality of mounting apertures 60-64 are provided in plate 46 to facilitate mounting of plate 46 and rail 45 to an underside ceiling portion of a portion of a trim press above a receiving bay provided therein. Likewise, a pair of mounting brackets 58 and 59 is mounted onto rail 44 to support rail 44 onto a frame of a trim press. According to one construction, brackets 58 and 59 are secured onto rail 44 using fasteners. According to another construction, brackets 58 and 59 are welded onto rail 44. A receiving end of tapered nose pieces 50 and 51 are inserted into a respective open end on each rail 44 and 45 to facilitate alignment and insertion of material receiving duct 10 into docking station 12 while inserting a trim press 14 for engagement within docking station 12 and beneath a trim press. According to one construction, each nose piece 50 and 51 is affixed onto and within each respective rail 44 and 45 using at least one threaded fastener. Optionally, nose pieces 50 and 51 can be integrally formed into rails 44 and 45, respectively.

As shown in FIG. 1, member 30 has been raised to a desired location relative to member 28 to present a top edge of material receiving duct 10 within and between rails 44 and 45 so as to eliminate any large gaps and prevent any operator from being able to insert their fingers into material receiving duct 10. Accordingly, rails 44 and 45 are positioned with a gap that is nominally larger than a corresponding outer dimension of a frame 56 of material receiving duct 10. Handles 34 and 35 are also affixed onto frame 56, such as by welding. Frame 56 further supports a pair of end plates 54 and 55 at each end which encompass a baffle plate 52 that extends within member 30 to reduce the entrance into member 30 and member 28. A pair of posts 40 and 41 is affixed onto a top horizontal surface of baffle plate 52. A distal receiving end of rails 44 and 45 each support a rubber bumper 48 and 49 which limit the insertion depth of material receiving duct 10 into docking station 12 so as to properly position duct 10 at a desired aligned location beneath an exit of a trim press.

FIG. 8 further illustrates the mounting of baffle plate 52 relative to sheet member 30 and sheet member 28 so as to restrict the cross-sectional width of material entrance 66. According to one construction, baffle plate 52 is affixed onto member 30 using fasteners. According to another construction, baffle plate 52 is welded onto member 30.

As shown in FIG. 8, member 28 is affixed onto top covers 24 and 25 using a plurality of threaded fasteners, such as bolts and nuts. Optionally, member 28 can be affixed onto top covers 24 and 25 via welding by welding member 28 onto covers 24 and 25. Optionally, member 28 can be welded directly onto top wall 32 of comminuting apparatus 14.

As shown in FIG. 8, telescopic adjustment of member 30 relative to member 28 provides for alignment of a different one of apertures 70 relative to a selected one of apertures 36. By positioning member 30 at a desired height for a selected docking station beneath a specific trim press, fasteners are subsequently inserted to a selected one of apertures 36 and apertures 37 for each of the four mounting locations provided between members 30 and 28. In this manner, an operator can affix the adjusted telescopic position of members 28 and 30 to a desired height position that will reduce or eliminate any gap between a top end of duct 10 and a bottom surface of a trim press. As shown in FIG. 8, material receiving duct 10 is adjusted so as to provide a material entrance 66 that communicates with a material exit 67. Material exit 67 of duct 10 communicates directly with an intake manifold 68 within comminuting apparatus 14. Intake manifold section 68 feeds scrap thermoformed sheet material and waste pieces between a pair of scissor rolls 70 and 72 for comminuting therebetween. Each scissor roll 70 and 72 includes a plurality of intermeshing scissor rings 76 as presently understood in the art. As material is fed between rolls 70 and 72, subdivided waste material is recirculated via a recirculation roll 74 having a plurality of paddles which recirculate the material for further subdividing between rolls 70 and 72. As understood in the art, a screen is provided for separating out sufficiently small subdivided pieces of waste material which are then drawn out via an outtake pipe 78 for storage and recycling in order to form a new sheet of thermoformable material for further processing in a thermoforming line.

As shown in FIG. 8, a sorting screen is provided for sorting relatively small pieces of scrap material for delivery out of comminuting apparatus 16 via pipe 78. A screen is provided along an outer periphery of recirculation wall 74. Optionally, a screen can be provided in other locations within comminuting apparatus 14.

According to one construction, the components of docking station 12 are made from pieces of steel tubing and sheet steel. For example, rails 44 and 45 can be formed from tubular sections of steel. Likewise, plates 46, 52, 54 and 55, as well as members 28 and 30, can be formed from sections of sheet steel. Optionally, such components can be made from stainless steel, aluminum, or any other suitable structural material.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A combination thermoforming trim press and comminuting apparatus, comprising:

a horizontal trim press having an exit for downwardly delivering a scrap web of thermoformable sheet material;

a comminuting apparatus provided beneath the exit and having an entrance for receiving the scrap web; and a height-adjustable delivery chute provided between the trim press exit and the comminuting apparatus entrance and including a lower entrance chute member, an upper entrance chute member telescopically received relative to the lower entrance chute member to provide height adjustment of the delivery chute relative to the comminuting apparatus, and a fastener for securing the chute at a selected height to substantially close any gaps between the trim press exit, the comminuting apparatus entrance and the delivery chute to eliminate any need for a shielding cage to prevent internal finger and limb access by an operator;

wherein the fastener comprises a retaining nut and bolt and a plurality of apertures provided on one of the upper entrance chute member and the lower entrance chute member and at least one aperture provided on another of the upper entrance chute member and the lower entrance chute member configured to be aligned at selected height-adjustable locations and configured to receive the bolt therein to affix telescopic positioning between the upper entrance chute member and the lower entrance chute member.

2. The combination of claim 1, wherein the height-adjustable delivery chute is mounted atop the comminuting apparatus.

3. The combination of claim 2, wherein the lower entrance chute member of the delivery chute is mounted atop the comminuting apparatus, and the upper entrance chute member is mounted telescopically about the lower entrance chute member.

4. The combination of claim 1, wherein the fastener is configured between the lower entrance chute member and the upper entrance chute member to secure and release the delivery chute at selected heights.

5. The combination of claim 1, wherein trim press exit is provided beneath a pair of co-acting trim dies of the trim press.

6. The combination of claim 1, wherein the comminuting apparatus entrance is provided above an intake manifold of the comminuting apparatus.

7. The combination of claim 1, wherein the comminuting apparatus includes at least two scissor rolls carried within the enclosure each with scissor rings configured to intermesh to cut waste material received therebetween.

8. The combination of claim 1, wherein the delivery chute provides a substantially vertical receiving duct mounted atop the comminuting apparatus and having a rectangular cross-sectional configuration.

9. The combination of claim 1, further comprising at least one handle provided on the upper entrance chute member of the delivery chute configured to enable tactile lifting of the upper entrance chute member while adjusting elevational length of the delivery chute.

10. The combination of claim 1, further comprising a docking station provided beneath the trim press exit configured to mate with the upper entrance chute member of the delivery chute when adjusted to a corresponding vertical height such that no large gap is provided between the upper entrance chute member of the delivery chute and the trim press exit.

11. The combination of claim 10, wherein the docking station comprises a pair of substantially parallel guide rails affixed onto a frame of the trim press along a ceiling portion above a receiving bay for the comminuting apparatus.

12. The combination of claim 11, wherein the docking station comprises a pair of tapered nose pieces each provided at an insert end of the bay on each guide rail configured to facilitate alignment and insertion of the material receiving duct into the docking station while inserting the comminuting apparatus into the bay beneath the trim press.

13. A combination thermoforming trim press and comminuting apparatus, comprising:
    a horizontal trim press having a downwardly extending scrap web exit for delivering a scrap web of thermoformable sheet material and a docking station proximate the trim press exit above a receiving bay;
    a comminuting apparatus provided beneath the exit and having an entrance for receiving the scrap web; and
    a delivery chute having a height-adjustable top mouth portion provided atop the comminuting apparatus entrance and including a base section, an elevator section telescopically received relative to the base section to provide height adjustment to the top mouth portion, and a fastener configured to secure together the base section and the elevator section at a position corresponding with a desired height for the top mouth portion to be received with the docking station such that no large gap is provided between the top-most mouth portion of the delivery chute and the trim press exit;
    wherein the fastener comprises a retaining nut and bolt and a plurality of apertures provided on one of the base section and the elevator section and at least one aperture provided on another of the base section and the elevator section configured to be aligned at selected height-adjustable locations and further configured to receive the bolt therein to affix telescopic positioning between the elevator section and the base section.

14. The trim press and comminuting apparatus of claim 13, wherein the delivery chute top mouth portion and the docking station mate in complementary relation so as to substantially close gaps between the trim press exit and the comminuting apparatus entrance of sufficient size to receive appendages of an operator.

15. The trim press and comminuting apparatus of claim 14, wherein the docking station comprises a pair of substantially parallel guide rails affixed onto a frame of the trim press along a ceiling portion above the receiving bay for the comminuting apparatus and a pair of tapered nose pieces each provided at an insert end of the bay on each guide rail configured to facilitate alignment and insertion of the material receiving duct into the docking station while inserting the comminuting apparatus into the receiving bay beneath the trim press.

* * * * *